United States Patent
Nakib

[11] 3,903,548
[45] Sept. 9, 1975

[54] HEART VALVE WITH TWO VALVING MEMBERS

[76] Inventor: Ahmad Aref Nakib, Houd-el-Wilaya, Beirut, Lebanon

[22] Filed: May 14, 1973

[21] Appl. No.: 360,137

[52] U.S. Cl. ............ 3/1.5; 137/512.1; 137/513.5; 137/527.8
[51] Int. Cl.² ....A61F 1/22; F16K 15/02; F16K 17/12
[58] Field of Search ........ 3/1, DIG. 3, 1.5; 137/512, 137/513.3, 512.1, 513.5, 527, 527.8

[56] References Cited
UNITED STATES PATENTS

| | | | |
|---|---|---|---|
| 2,756,017 | 1/1956 | Silverman | 137/527.8 X |
| 2,856,956 | 10/1958 | Smolensky | 137/512.1 |
| 2,926,692 | 3/1960 | Zillman et al. | 137/512.1 X |
| 3,445,863 | 5/1969 | Wada | 3/1 |
| 3,476,143 | 11/1969 | Kaster | 3/1 X |
| 3,722,004 | 3/1973 | Cromie | 3/1 |
| 3,737,919 | 6/1973 | Child | 3/1 |

FOREIGN PATENTS OR APPLICATIONS

| | | | |
|---|---|---|---|
| 1,160,008 | 7/1969 | United Kingdom | 3/DIG. 3 |

*Primary Examiner*—Ronald L. Frinks

[57] ABSTRACT

A heart valve having a base with a passage for directing the flow of blood through the base. A pair of free floating independent discs located in the passage operate to control the one-way flow of blood through the passage. The discs are free to randomly rotate about their axes as they move from the open to the closed positions. Proximal and distal guide and retaining structures hold the discs in operative assembled relation with the base.

19 Claims, 20 Drawing Figures

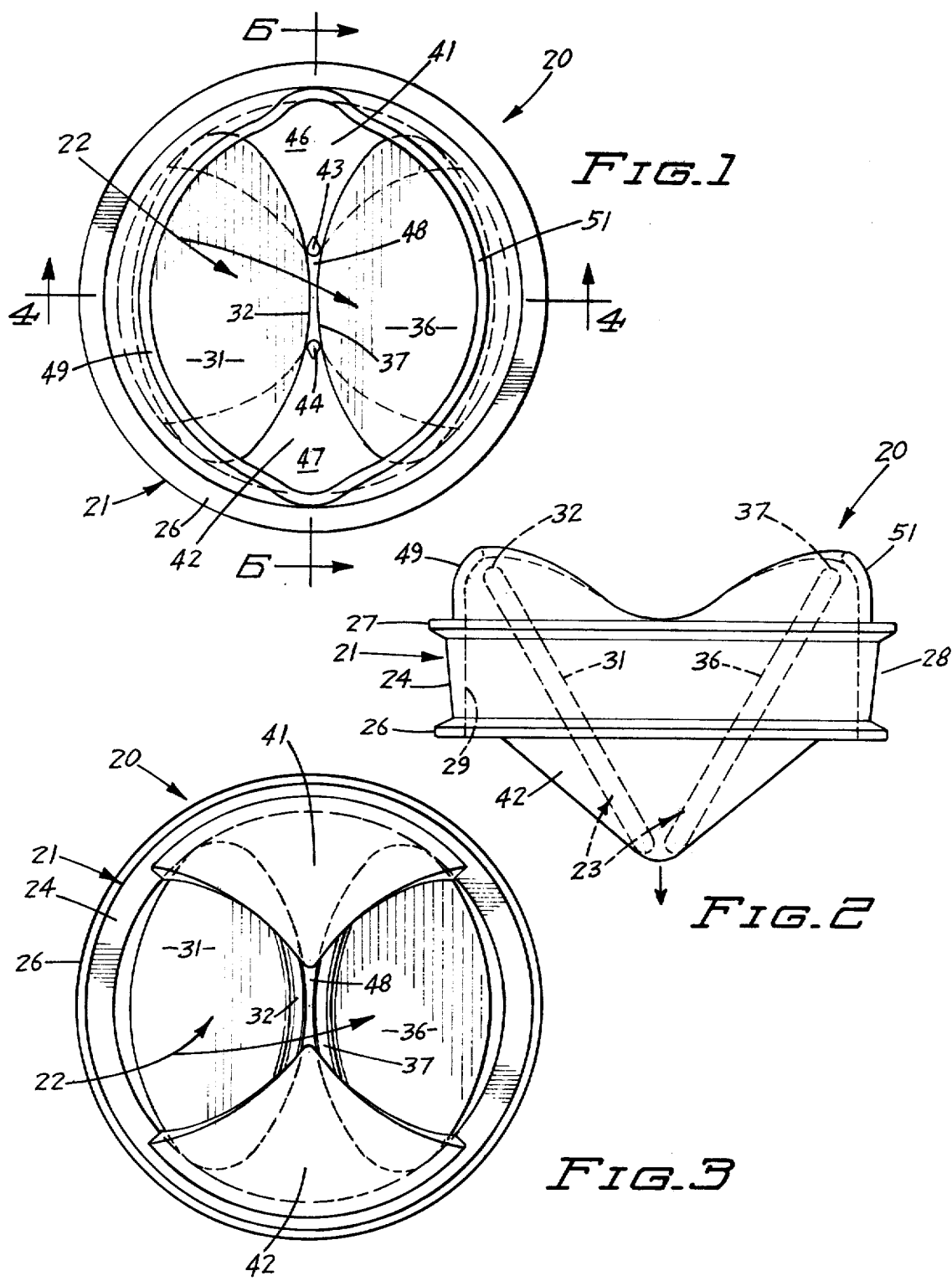

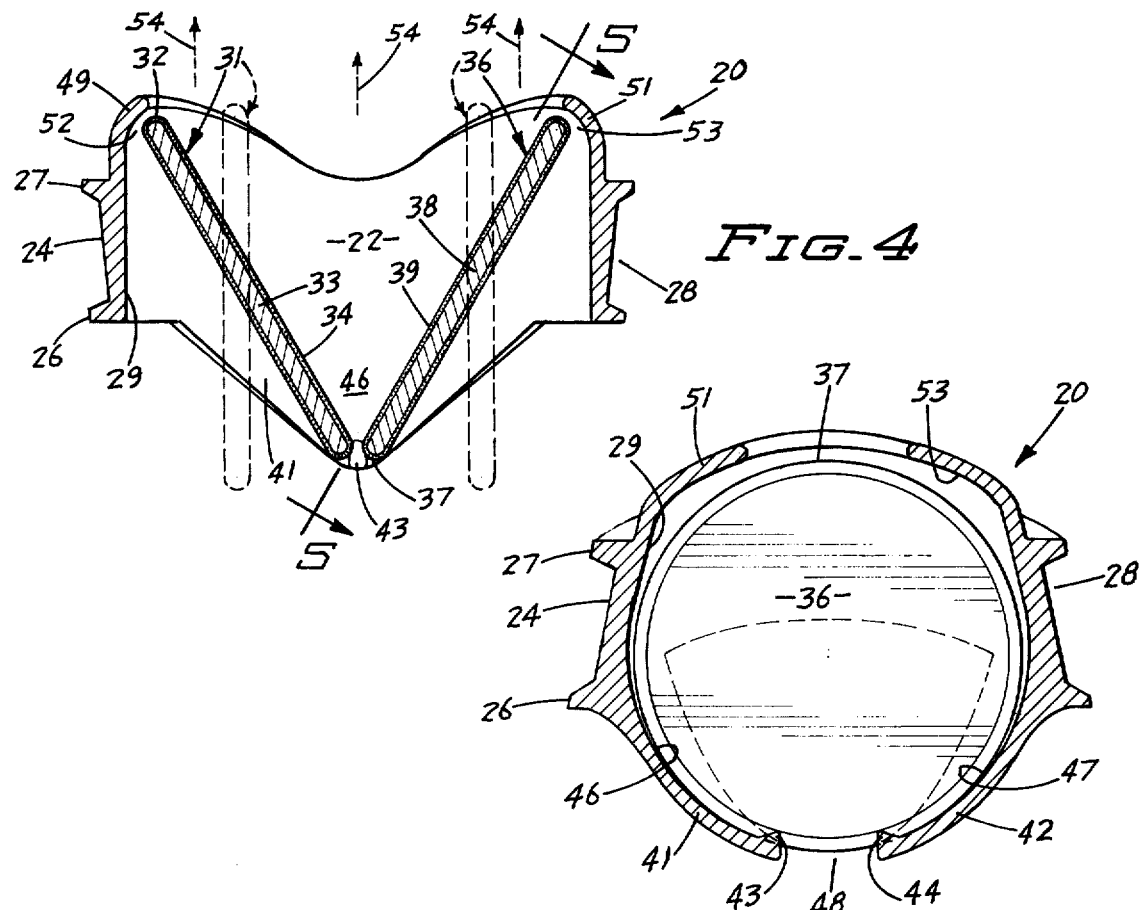
Fig. 4
Fig. 5
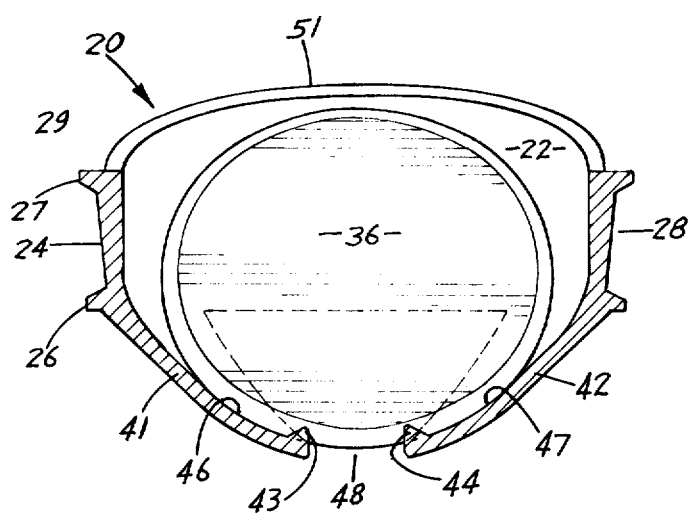
Fig. 6

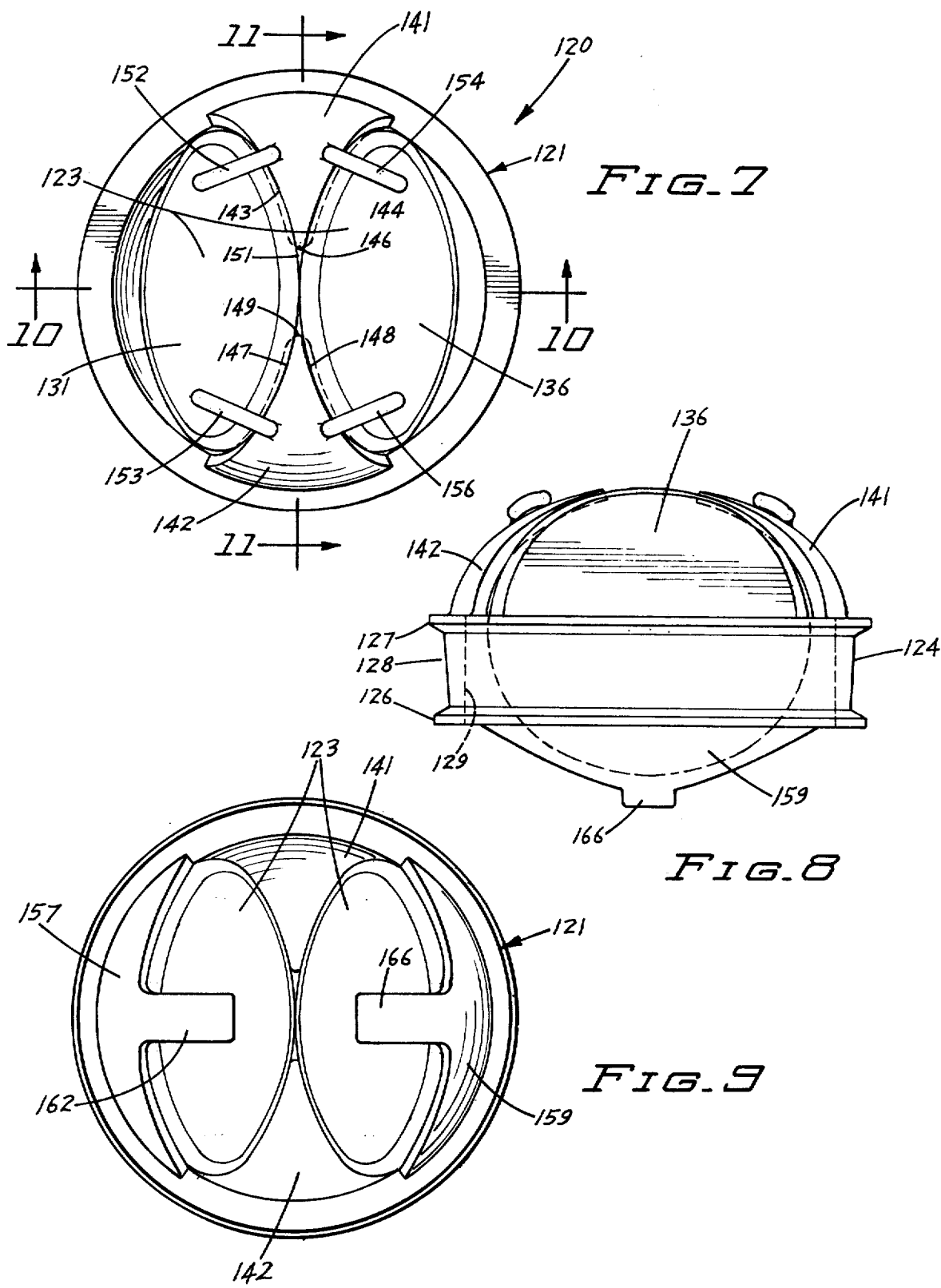

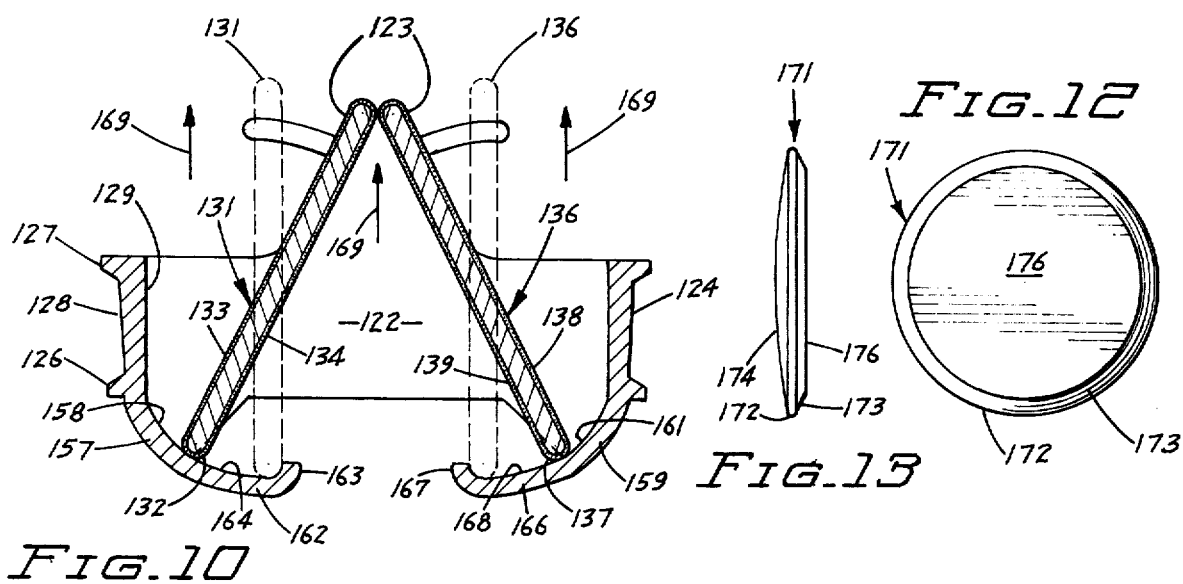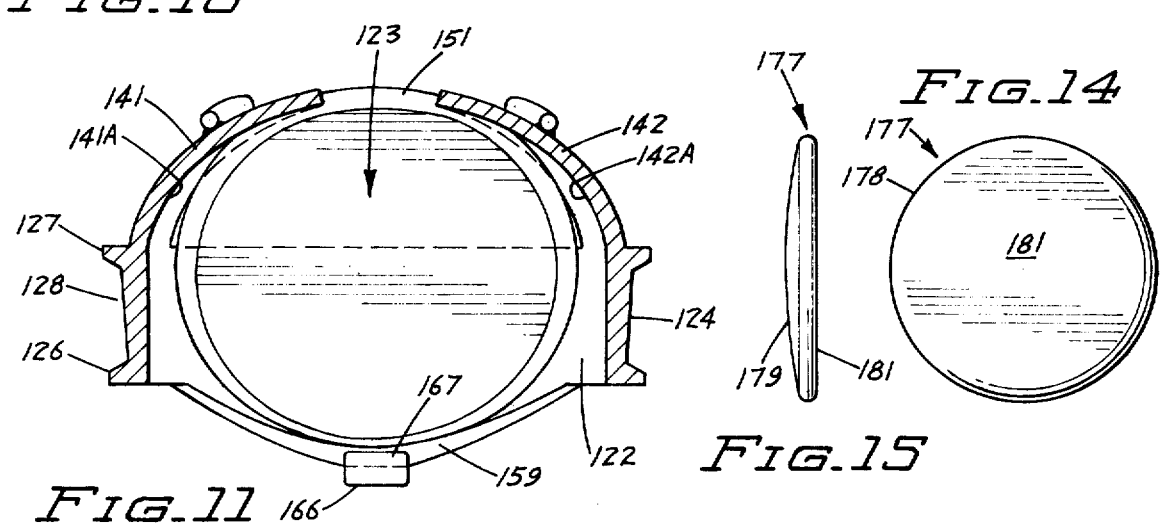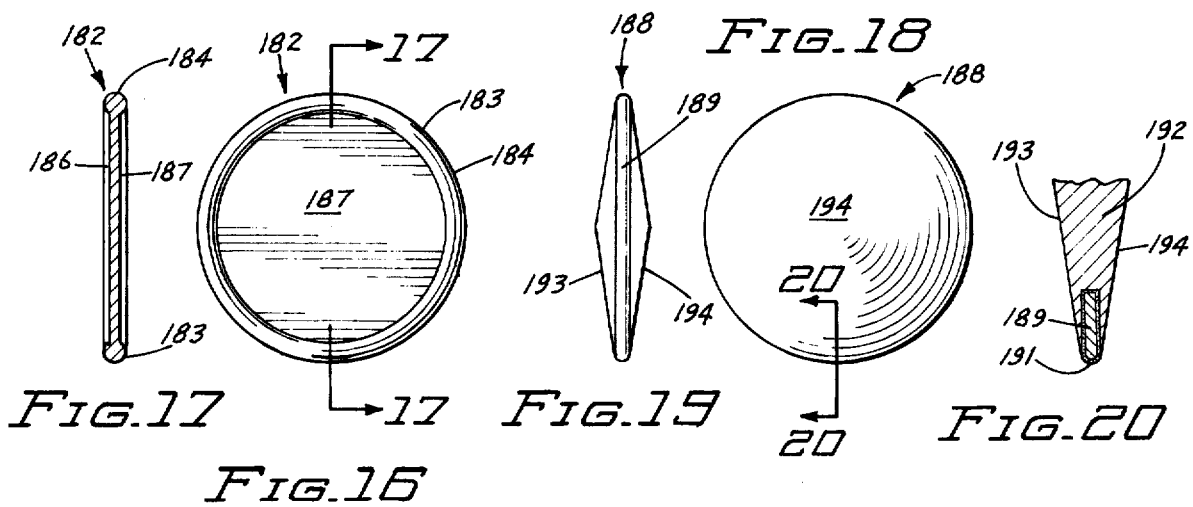

ns have been developed to replace natural heart valves to control the flow of blood in the heart. Mon and Woodward in 1964 disclose in U.S. Pat. No. 3,312,237 a bicuspid heart valve having a resilient flapper member hinged about a center pin. Opposite portions of the flapper move relative to each other to control the flow of blood through the valve. Wada in 1966 shows in U.S. Pat. No. 3,445,863 a heart valve having two half circle valve plates. Each plate has a pair of cut outs or notches to mount the plates on a ring thereby preventing rotation of the plates as they move from the open to closed positions. Servelle in 1967 shows in British Pat. No. 1,160,008 a heart valve having two semicircular flat flaps pivoted with pins to a valve base. Leibinsohn disclosed in 1969 in U.S. Pat. No. 3,626,518 a cardiac valve having a ball and a ring retained with a cage on an annular base. This ball closes on the ring and does not operate independently of the ring. Also, the ball prevents centralized flow of blood through the valve passage.

The pivot pins and fixed hinges for the valving plates and flaps of the above valves are not effectively washed by the blood and are sites for thrombosis formations which can immobilize the valve. The plates and flaps are not free to rotate about their axes as they move from open to closed positions thus causing localized sites of wear and stress. These disadvantages are obviated by the heart valve of the present invention.

SUMMARY OF INVENTION:

The invention broadly relates to a one-way check valve for controlling the flow of a fluid. The valve is specifically a heart valve prosthesis operable to replace the natural heart valve to control the flow of blood in a heart. The valve has a generally annular base or housing having a passage permitting the flow of blood through the base. A pair of valving means located generally within the passage are movable to a first position to restrict the flow of blood through the passage in one direction and movable to a second position to permit centralized flow of blood through the passage in the opposite direction. Means having guide and retaining surfaces hold the valving means in assembled relation with the base. The valving means can be two discs which operate independently of each other to control the flow of blood through the valve passage. The discs are free to move relative to each other and freely rotate about their own axes. The discs are substantially the same size and configuration and have coordinated concurrent transitory movement between their open and closed positions to control the flow of blood through the passage in the base. Each disc has a circular configuration with an annular uninterrupted outer peripheral edge which permits each disc to independently rotate 360° about its own axis as it moves between its open and closed positions. Both discs are held in free floating relation with the base by the retaining structure which cooperates with the uninterrupted peripheral edge portion of the discs.

The discs of the valve have relatively small diameters whereby the entire valve has a low structural profile. The discs are washed with equal and optimum efficiency because of the central and streamlined flow of the blood adjacent the opposite sides of both discs. The guide and retaining surfaces for each disc are also washed. The valve has two discs, whereby if one of the discs malfunctions, the valve will still operate, preventing the demise of the patient. The valves have a minimum of movement between their open and closed positions whereby they open and close with a minimum of time and effort. The base retaining and guide structures as well as the discs do not have any structure that are potential sites for the formation of clot streamers or thrombosis formations. The valving discs and retaining structures are located in the ventrical cavity when in the aortic position. This obviates the possibility of interference to movement of the discs from the aortic wall.

IN THE DRAWINGS:

FIG. 1 is a top or distal plan view of the heart valve of the invention;

FIG. 2 is a side elevational view of FIG. 1;

FIG. 3 is a bottom or proximal view of the heart valve of FIG. 1;

FIG. 4 is a sectional view taken along the line 4—4 of FIG. 1;

FIG. 5 is a sectional view taken along the line 5—5 of FIG. 4;

FIG. 6 is a sectional view taken along the line 6—6 of FIG. 1;

FIG. 7 is a top or distal plan view of a modification of the heart valve of the invention;

FIG. 8 is a side elevational view of the right side of FIG. 1;

FIG. 9 is a bottom or proximal plan view of the heart valve of FIG. 7;

FIG. 10 is a sectional view taken along line 10—10 of FIG. 7;

FIG. 11 is a sectional view taken along line 11—11 of FIG. 7;

FIG. 12 is a plan view of the proximal side of a first disc usable as one of the valving means of the heart valve of the invention;

FIG. 13 is a side view of FIG. 12;

FIG. 14 is a plan view of a second disc usable as one of the valving means of the heart valve of the invention;

FIG. 15 is a side view of FIG. 14;

FIG. 16 is a plan view of a third disc usable as one of the valving means of the heart valve of the invention;

FIG. 17 is a sectional view taken along line 17—17 of FIG. 16;

FIG. 18 is a plan view of a fourth disc usable as one of the valving means of the heart valve of the invention;

FIG. 19 is a side view of FIG. 18; and

FIG. 20 is an enlarged sectional view taken along line 20—20 of FIG. 18.

Referring to the drawings, there is shown in FIGS. 1–6 a heart valve prosthesis indicated generally at 20 usable to replace a natural heart valve to control the flow of blood in a heart. The valve 20 has a generally annular base or housing 21 having a passage 22 through the base. Valving or occluder means indicated generally at 23 are located in the passage to control one-way flow of blood through the passage. The base 21 has a cylindrical outside wall 24 having a proximal annular flange 26 and a distal annular flange 27. An annular groove 28 located between flanges 26 and 27 accommodates a sewing ring or suturing member (not shown) used to attach the base 21 to the heart tissue. Base 21 has a generally cylindrical inside wall 29 forming the passage 22 through the base.

The valving means 23 comprises a first disc 31 located in the left sector of passage 22, as shown in FIGS. 1–4. Disc 31 has an outer annular uninterrupted peripheral edge 32. Referring to FIG. 4, disc 31 has a generally flat or uniplanar configuration and comprises a circular core or substrate 33 covered with a coating or skin 34. The skin 34 can be one or more layers of a Pyrolytic carbon. A second disc indicated generally at 36 is located in the right sector of passage 22. Disc 36 is identical in size and configuration with disc 31 and has an outer annular uninterrupted peripheral edge 37. As shown in FIG. 4, disc 36 has a cylindrical core 38 carrying a coating or skin 39. The skin 39 can be one or more layers of Pyrolytic carbon.

The discs 31 and 36 are retained in assembled free floating relation with base 21 by proximal members 41 and 42. Members 41 and 42 have generally triangular shapes and are integral with the proximal side of the base 21. As shown in FIG. 3, members 41 and 42 extend toward each other from opposite sides of base 21 and are spaced from each other by a diametrical center space 48. An inwardly directed stop projection 43 is located on the inside of the apex of proximal member 41. In a similar manner, an inwardly directed stop projection 44 is located in the inside of the apex of proximal member 42. The proximal members 41 and 42 each have internal guide surfaces 46 and 47, respectively, which control the coordinated transitory movement of the discs 31 and 36 as well as retain the discs 31 and 36 in free floating assembled relation with the base 21. As shown in FIG. 5, the internal guide surfaces 46 and 47 have a generally uniform curvature on the outer peripheral edge of the disc. This permits the discs to have free floating movement as they can freely rotate about their central axes. Also, the surfaces 46 and 47 permit limited reverse flow of blood through passage 22 when the discs are in the closed position, as shown in FIGS. 3 and 4. The stop projections 43 and 44 hold the adjacent peripheral portions of the disc slightly spaced from each other whereby a limited amount of reverse flow of blood can flow between the discs 31 and 36.

The distal side of base 21 has a pair of semi-circular distal lips 49 and 51. Lips 49 and 51 have inside guide and retaining surfaces 52 and 53, respectively, which cooperate with the outer peripheral edges of the discs 31 and 36 to guide and retain the discs in free floating relation with the base 21. The guide surfaces 52 and 53 have curvatures which are slightly larger than the circumferential curvature of the outer peripheral edges of the discs whereby the discs are free to rotate about their axes 360° during the transitory movement between the open and closed positions.

In use, assuming the discs 31 and 36 are in the closed position as shown in FIG. 4, the discs 31 and 36 are located at oppositely inclined positions. The discs are located at an angle of approximately 35° from the longitudinal axis of passage 22. The outer peripheral edges of the discs are in close association with the inside surfaces 46 and 47. The portions of the outer peripheral edges 32 and 37 engage the surfaces 46 and 47, respectively. An increase in the pressure of the blood on the proximal side of the discs 31 and 36 simultaneously raises the discs from the surfaces 46 and 47 and changes the angular positions of the discs until they are substantially parallel to the flow of blood through passage 22. The discs 31 and 36 are shown in the open position by broken lines in FIG. 4. The flowing fluid as well as the curvature of the inside surfaces 46 and 47 and the inside guide surfaces 52 and 53 control the coordinated transitory movements of the discs from their closed positions, as shown in full lines in FIG. 4, to their open positions, as shown in broken lines in FIG. 4. During the movement of the discs between the closed position and the open position they are free to randomly rotate about their respective axes thereby avoiding any localized stress and wear points.

When the discs 31 and 36 are in the open position, the blood is free to flow through the center portion of passage 22 as well as opposite sides of both discs 31 and 36, as indicated by arrow 54 in FIG. 4. The blood flowing on opposite sides of the discs provides for a continuous washing of both discs as well as the washing of the inside wall and guide surfaces of the valve base. The distal portions of discs do not extend an appreciable distance beyond the distal lips 49 and 51 so that any tissue in the aorta cannot interfere with the movements of the discs. The distal opening of the passage as shown in FIG. 1 is not restricted by any structure which would interfere with the centralized flow of blood, cause turbulence in the blood flow, or an increase in the pressure gradient across the valve.

As shown in FIG. 3, the inlet openings to passage 22 are located between the proximal members 41 and 42. The inlet openings are angularly disposed relative to each other and are of a total area greater than the cross sectional area of passage 22. Thus, the proximal members 41 and 42 do not interfere with or restrict the flow of blood through the passage 22.

Discs 31 and 36 move from the open position to the closed position in response to a decrease in the proximal pressure of the blood which causes the reverse flow of blood through passage 22. The reverse flow of blood carries discs 31 and 36 in the proximal direction. The discs 31 and 36 ride on the inside guide surfaces 46 and 47 which change the angular position of the discs. The blood acting on the distal surfaces of discs 31 and 36 quickly forces the discs to their closed positions with portions of the discs in engagement with the stop projections 43 and 44, respectively. When the discs are in their closed positions, there is a minimal reverse flow of fluid through the center space 48 and between the outer peripheral edges 32 and 37 of the discs 31 and 36 and the adjacent portions of the inside wall 29 of the base.

In use, the valve 20 has an unrestricted centralized flow of blood through passage 22. No portion of the valving discs 31 or 32 or the retaining structures cuts across the central longitudinal axis of the valve opening 22. The proximal members 41 and 42 extend in a proximal direction from the base 21 whereby the valve has a low distal structural profile. The discs 31 and 32 are sheltered by the base structure, thus the heart tissue or aortic wall tissue cannot interfere with the operation of the discs 31 and 36. The discs 31 and 36 are free to randomly rotate about their central axes as they move between their open and closed positions. The discs are free to rotate as they have annular uninterrupted outer peripheral edges 32 and 37, respectively, and are of a size smaller than the opening through the valve base.

During the opening of the discs, the blood flows past the opposite surfaces of both discs to provide a continuous washing of both surfaces of the discs. In addition, the blood washes the inside wall 29 of the base 21 as well as the inside retaining and guide surfaces 46, 47, 52 and 53. The washing of the discs and the inside surfaces of the valve base is aided by the random rotation of the discs. The fluid boundary layer on the outer peripheral edges 36 and 37 of the discs is swept past the adjacent inside surfaces of the valve base as the discs move between their open and closed positions. The inside surfaces of the base are relatively smooth. There are no cul-de-sacs or pockets where blood can collect and stagnate when the discs are either in the open or closed position. Transitory movement of the discs between their open and closed position is at a minimum. This reduces the amount of travel of the discs between the open and closed positions and minimizes regurgitation of blood through the valve passage 22. This results in a minimum of turbulence of blood.

A modified heart valve indicated generally at 120 is shown in FIGS. 7–11. Valve 120 has an annular base or housing 121. Base 121 is generally ring-shaped having a central passage 122 for carrying blood through the valve. Valving means or occluder means 123 positioned in the passage 122 operates to permit flow of blood one way through passage 122 and restrict the flow of blood in the opposite direction through the passage.

Base 121 has an outside continuous wall 124. A first proximal annular outwardly directed flange 126 and a second distal annular outwardly directed flange 127 form with wall 124 an annular space or groove 128 for accommodating a sewing ring or suturing member (not shown). Base 121 has an inside generally cylindrical wall 129 surrounding passage 122.

Valving means 123 comprises a pair of free floating valving members or discs 131 and 136. The discs 131 and 136 are free to move relative to each other and relative to the base to control the flow of blood through passage 122. The first disc 131 has an outer annular uninterrupted peripheral edge 132 and flat or uniplanar sides 133 and 134. Second disc 136 is identical to disc 131 and has an outer annular uninterrupted peripheral edge 137 and flat or uniplanar sides 138 and 139. The discs 131 and 136 can have Pyrolite skins, as shown in disc 31.

The discs 131 and 136 are retained or held in assembled free floating relation to the base 121 by distal side members 141 and 142. As shown in FIGS. 7 and 8, the side members 141 and 142 project upwardly and curve inwardly toward each other from the distal side of the base 121. Each side member has a generally triangular shape and inside surfaces 141A and 142A. Side member 141 has arcuate edges adapted to be engaged by discs 131 and 136, respectively. Edges 143 and 144 merge into an apex 146 offset from the central axis of passage 122. The side member 142 has arcuate edges 147 and 148 engageable with discs 131 and 136, respectively. Edges 147 and 148 merge into apex 149 facing the apex 146. A transverse space 151 separates the apexes 146 and 149.

Short arms or members 152 and 153 project upwardly and outwardly from side members 141 and 142 adjacent the peripheral edge 132 of the disc 131. Similar arms or members 154 and 156 project upwardly and outwardly from the side members 141 and 142, respectively, adjacent the outer peripheral edge 137 of disc 136. Arms 152 and 153 cooperate with the outer peripheral edge 132 of the disc 131 to hold the disc in assembled relation with the base and permit rotation of the disc 131 about its axis during the opening and closing of the disc 131. The arms 154 and 156 perform a similar function for the disc 136.

Referring to FIGS. 8, 9 and 10, a pair of lips 157 and 159 extend downwardly and curve inwardly from opposite portions of the proximal side of base 121. Lip 157 has an inside curved surface 158 accommodating the outer peripheral edge 132 of disc 131. Lip 159 has a curved inside surface 161 accommodating the outer peripheral edge 137 of disc 136. Extended radially inwardly from the mid-portion of lip 157 is a first projection or leg 162 having an upwardly directed toe or stop 153 engageable with a peripheral portion of disc 131 to limit the open position of the disc as shown in broken lines in FIG. 10. The lip 159 has an inwardly directed projection or leg 166 aligned with the leg 162. The terminal end of leg 166 has an upwardly directed toe or stop 167 that functions as a stop for disc 136. Leg 162 has a distal surface 164 which functions as a guide surface during the movement of the disc 136 in the closed position. Leg 166 has a guide surface 168 cooperating with the disc 136 during movement of the disc from its open position to its closed position.

In use, assuming the discs 131 and 136 are in the closed position as shown in full lines in FIG. 10, the discs are located at oppositely inclined positions. Distal portions of the discs engage each other adjacent the ends of the side members 141 and 142. The outer peripheral edges 132 and 137 of the discs are in close association with the inside surfaces 158 and 161 of the lips 158 and 159, the internal wall 129 of base 121 and the edges 143, 147 and 144, 148 of the side members 141 and 142.

An increase in the pressure of blood on the proximal sides 134 and 139 of the discs 131 and 136 simultaneously raises the disc from the surfaces 158 and 161 and changes the angular position of the discs until they are substantially parallel to each other and parallel to the flow of blood through passage 122, as shown in broken lines in FIG. 10. The discs 131 and 136 engage the arms 152 and 153 and 154 and 156, respectively, during the transitory movement from the closed positions to the open positions. During the concurrent transitory movement of the discs 131 and 136 between the closed positions, shown in full lines in FIG. 10, the discs are free to randomly rotate about their respective axes and are free to angularly move relative to each other thereby avoiding localized stress and wear points.

When the discs 131 and 136 are in the open positions, the blood is free to flow through the center portion of passage 122 as well as on adjacent opposite sides of the discs 131 and 136, as indicated by arrows 169 in FIG. 10. The flowing blood also continuously washes the inside wall 129, the inside surfaces 158 and 161 of the lips 157 and 159, and the inside surfaces 141A and 142A of the side members 141 and 142. The washing of the discs 131 and 136 and the inside surfaces of the valve base are aided by the random rotation of the discs 131 and 136 as they move between their open and closed positions. The fluid boundary layers on the outer peripheral edges of the discs are swept past the adjacent inside surfaces of the valve base thereby preventing any pockets of stagnant blood.

Proximal legs 162 and 166 project away from the proximal side of the valve of base 129 and do not interfere with the flow of blood into the passage 122. The openings adjacent the sides of the legs 162 and 166 are larger than the cross sectional area of the passage 122 and accordingly do not restrict the flow of blood into the passage. Distal side members 141 and 142 project away from the distal or top side of base 121. The space between the sides of the members 141 and 142 on the top of the base 121 is substantially greater than the cross sectional area of the passage 122. Accordingly, the distal side members 141 and 142 do not interfere with or restrict the flow of blood from passage 122. The side members 141 and 142 being spaced from each other do not interfere with a centralized flow of blood through passage 122.

Discs 131 and 136 move from the open positions to the closed positions in response to a decrease in the proximal pressure of the blood. This causes a reverse flow of blood through passage 122. Reverse flow of blood carries the discs 131 and 136 in the proximal direction and simultaneously moves the distal portions of the discs toward each other and the proximal portions of the discs away from each other. The blood acting on the distal surfaces of the discs 131 and 136 quickly forces the disc to a closed position with portions of the discs in engagement with each other and in engagement with the edges 143, 144, 147 and 148 of the side members 141 and 142. When the discs 131 and 136 are in the closed position, there is a minimal reverse flow of blood through the center space 151 and between the outer peripheral edges 132 and 137 of the discs and adjacent portions of the inside wall 129 and lip surfaces 158 and 161.

Referring to FIGS. 12 and 13, there is shown a modification of the disc indicated generally at 171 usable with the valves 20 and 120. Disc 171 is a circular member having an outer annular uninterrupted peripheral edge 172 joined to an inwardly tapered circumferential face 173. The distal side 174 of disc 171 has a convex or curved configuration. The proximal side 176 is flat or uniplanar.

Referring to FIGS. 14 and 15, there is shown a second modification of the disc indicated generally at 177. Disc 177 is a circular member having an outwardly directed annular peripheral edge 178. One side of the disc 179 is a convex structural configuration. The opposite side 181 is generally flat or uniplanar.

FIGS. 16 and 17 show a third disc usable as one of the valving means of the heart valve of the invention. The disc, indicated generally at 182, has a circular outer peripheral bead 183 having an outer annular uninterrupted edge 184. A relatively thin circular body having uniplanar or flat sides 186 and 187 is joined with the bead 183 to form the one piece disc member. The body has a thickness which is smaller than the cross section or diameter of the bead 183.

A fourth type of disc, indicated generally at 188, is shown in FIGS. 18–20. Disc 188 has an annular generally flat ring 189 surrounding the outer peripheral edge of the disc. The ring 189 has an outer annular uninterrupted edge 191 and is joined to a body 192. The ring 189 can be molded directly in the body 192. The body 192 has outwardly directed generally flat cone-shaped sides 193 and 194. The ring 189 has an outer coating or skin of Pyrolite carbon.

There have been shown and described preferred embodiments of the heart valve of the invention. It is understood that changes in materials, size and shapes of the various elements may be made by those skilled in the art without departing from the spirit of the invention.

The embodiments of the invention in which an exclusive property or privilege is claimed are defined as follows:

1. A heart valve for controlling the flow of blood comprising: base means having a passage with a blood inlet side and a blood outlet side through which blood can flow; a pair of valving disc means located generally within said passage for controlling the flow of blood through said passage, said disc means being the only obstruction to the flow of blood in said passage, each of said pair of valving disc means being smaller than said passage and movable to closed oppositely inclined positions to restrict the flow of blood through the passage in one direction and movable to open generally parallel positions to permit the flow of blood through the passage in the direction opposite the one direction, each of said valving disc means having opposite sides and an axis about which the valving disc means is free to rotate; and retaining means cooperating with the base means and valving disc means to hold the valving means in free floating relationship with the base means and retaining means, said retaining means having a first means on one side of said base and a second means on the other side of said base, said first means including members having two symmetrical pairs of interior guide surfaces to control coordinated transitory movement of the valving disc means and with the base means allow the valving disc means freedom to rotate about their axes as they move between the open and closed positions, one pair of interior guide surfaces cooperating with one valving disc means and the other pair of interior guide surfaces cooperating with the other valving disc means, said first means locating the valving disc means when in the open generally parallel positions in locations where blood flows adjacent the opposite sides of the valving disc means whereby blood washes the opposite sides of the valving disc means, said second means including means cooperable with the first means to locate the disc means in the passage.

2. The valve of claim 1 wherein: the valving disc means comprise a first disc located in one portion of the passage and a second disc located in another portion of the passage.

3. The valve of claim 2 wherein: the first disc is generally the same size and shape as the second disc.

4. The valve of claim 2 wherein: the first disc and the second disc each have annular outer uninterrupted peripheral edges cooperating with the retaining means and base means to hold the valving means whereby the discs can randomly rotate about their axes as they move between the open and closed positions.

5. The valve of claim 1 wherein: the first means includes triangularly shaped members on the base means for guiding the valving means.

6. The valve of claim 5 wherein: the members are attached to diametrically opposite portions of the base and project outward from the base and toward each other being spaced from each other by a diametric center space, said members having inside curved surfaces providing said pairs of interior guide surfaces for guiding the valving disc means for movement between the open and closed positions.

7. The valve of claim 6 wherein: the valving disc means comprise a first disc and a second disc.

8. The valve of claim 7 wherein: the first disc is generally the same size and shape as the second disc.

9. The valve of claim 1 wherein: the second means includes means on the blood outlet side of the base means for guiding the movement of the valving disc means.

10. The valve of claim 9 wherein: the means on the blood outlet side of the base comprises a pair of arcuate lips having inside surfaces for guiding the movement of the valving means between the open and closed positions.

11. The valve of claim 10 wherein: the valving disc means comprises a first disc and a second disc, said discs being movable relative to each other to open and close the passage.

12. The valve of claim 11 wherein: the first disc is generally the same size and shape as the second disc.

13. The valve of claim 1 wherein: the second means include lip means having inside curved surfaces for guiding the valving disc means for movement between the open and closed positions.

14. The valve of claim 13 including: stop means on the members engageable by the valving disc means when the valving disc means are in the closed position, said stop means holding adjacent portions of the valving disc means spaced from each other thereby permitting limited reverse flow of blood through the passage.

15. The valve of claim 1 including: stop projection means on the base means, said projection means being engaged by portions of the valving disc means when the valving disc means are in the closed position for holding the valving disc means spaced from each other thereby allowing limited reverse flow of blood past adjacent portions of the valving disc means.

16. The valve of claim 1 wherein: the valving disc means comprise a pair of discs, each disc having at least one convex side.

17. The valve of claim 1 wherein: the valving disc means comprise a pair of discs, each disc having an annular outer peripheral bead.

18. The valve of claim 1 wherein: the valving disc means comprise a pair of discs, each disc having an annular outer peripheral ring, said ring having a Pyrolite carbon outer surface.

19. The valve of claim 1 wherein: the retaining means includes first means on the inlet side of the base means and second means on the outlet side of the base means, said valving disc means including a pair of discs extended through the passage, said discs cooperating with the first means and second means to hold the discs in free floating relationship with the base means.

* * * * *